(12) United States Patent
Yabuhara

(10) Patent No.: US 10,839,277 B2
(45) Date of Patent: Nov. 17, 2020

(54) RFID TAG AND RFID TAGGED ARTICLE

(71) Applicant: Murata Manufacturing Co., Ltd., Nagaokakyo (JP)

(72) Inventor: Yuki Yabuhara, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 16/872,726

(22) Filed: May 12, 2020

(65) Prior Publication Data

US 2020/0285927 A1 Sep. 10, 2020

Related U.S. Application Data

(63) Continuation of application No. PCT/JP2019/044104, filed on Nov. 11, 2019.

(30) Foreign Application Priority Data

Mar. 6, 2019 (JP) ................. 2019-040368

(51) Int. Cl.
*G06K 19/07* (2006.01)

(52) U.S. Cl.
CPC ..... *G06K 19/0723* (2013.01); *G06K 19/0716* (2013.01)

(58) Field of Classification Search
None
See application file for complete search history.

(56) References Cited

U.S. PATENT DOCUMENTS

| 2011/0227710 A1 | 9/2011 | Nogami |
| 2012/0187198 A1 | 7/2012 | Kato et al. |
| 2017/0344872 A1* | 11/2017 | Komaki ............ H01L 21/56 |
| 2018/0060718 A1 | 3/2018 | Akamatsu et al. |
| 2019/0073579 A1* | 3/2019 | Kato ............... G06K 19/0775 |
| 2019/0228283 A1 | 7/2019 | Eshima et al. |

FOREIGN PATENT DOCUMENTS

| WO | 2010026939 A1 | 3/2010 |
| WO | 2011111509 A1 | 9/2011 |
| WO | 20161707752 A1 | 10/2016 |
| WO | 2018092583 A1 | 5/2018 |

OTHER PUBLICATIONS

International Search Report issued for PCT/JP2019/044014 dated Feb. 4, 2020 and Written Opinion issued for PCT/JP2019/044014 dated Feb. 4, 2020.

* cited by examiner

*Primary Examiner* — Kristy A Haupt
(74) *Attorney, Agent, or Firm* — Arent Fox LLP

(57) ABSTRACT

An RFID tag includes a substrate, an RFIC, and a conductive screw. The substrate includes a first surface and a second surface that are opposite to each other. The RFIC is connected to the first-surface-side conductor pattern provided on the first surface of the substrate. The first surface of the substrate includes a sealing resin layer. The conductive screw is electrically connected to the first-surface-side conductor pattern and the second-surface-side conductor pattern provided on the second surface, and is screwed to a conductive element.

20 Claims, 18 Drawing Sheets

RFID TAG AND RFID TAGGED ARTICLE

CROSS REFERENCE TO RELATED APPLICATIONS

The present application is a continuation of PCT/JP2019/044104 filed Nov. 11, 2019, which claims priority to Japanese Patent Application No. 2019-040368, filed Mar. 6, 2019, the entire contents of each of which are incorporated herein by reference.

FIELD OF THE INVENTION

The present invention relates to a radio frequency identification (RFID) tag configured to be used while being attached to a metal article, and an RFID tagged article including the metal article and the RFID tag.

BACKGROUND

International Publication No. 2018/092583 discloses an RFID tag to be attached to a metal surface, and an RFID tagged article. As disclosed therein, the RFID tag includes a resin block, a substrate provided in the resin block, an RFIC element mounted on the substrate, and a loop electrode connected to the RFIC element. The RFID tag is adhered to the metal surface, for example, through an adhesive layer.

In the RFID tagged article disclosed in International Publication No. 2018/092583, the RFID tag adhered to a metal surface with an adhesive may come off relatively easily due to the environment (external factors, for example) such as ambient atmosphere, liquid quality, changes in temperature, and an impact. Further, a small steel article, such as a medical instrument, is exposed to a high temperature environment when sterilization treatment is performed, for example. In such a high temperature environment, since a volatile chemical substance (released gas, for example) may be released from the adhesive, the structure of the RFID tagged article may not be suitable for a medical instrument or the like with an RFID tag.

SUMMARY OF THE INVENTION

In view of the foregoing, exemplary embodiments of the present invention provide an RFID tag and an RFID tagged article that have a high environmental resistance and do not generate a released gas, even at high temperature exposure.

Accordingly, an RFID tag of an exemplary aspect includes a substrate including a first surface and a second surface that are opposite to each other, a first-surface-side conductor pattern provided on the first surface, a second-surface-side conductor pattern provided on the second surface, and a plurality of interlayer connection holes provided from the first surface to the second surface and used to connect the first-surface-side conductor pattern and the second-surface-side conductor pattern. Moreover, an RFIC is mounted on the first surface of the substrate, and connected to the first-surface-side conductor pattern or electromagnetically coupled to the first-surface-side conductor pattern. A plurality of interlayer connection conductors are provided in each of the plurality of interlayer connection holes, and include a conductive screw inserted in one of the plurality of interlayer connection holes and electrically connected to the first-surface-side conductor pattern and the second-surface-side conductor pattern.

In addition, an RFID tagged article according to an exemplary aspect includes an article including a conductive element, and the RFID tag that is screwed to the conductive element by the conductive screw.

According to the exemplary embodiments provided herein, an RFID tag and an RFID tagged article that have a high environmental resistance and have no risk of generating a released gas are able to be obtained.

The above and other elements, features, steps, characteristics and advantages of the exemplary embodiments will become more apparent from the following detailed description of the exemplary embodiments with reference to the attached drawings.

DETAILED DESCRIPTION OF THE EXEMPLARY EMBODIMENTS

Figure 1:
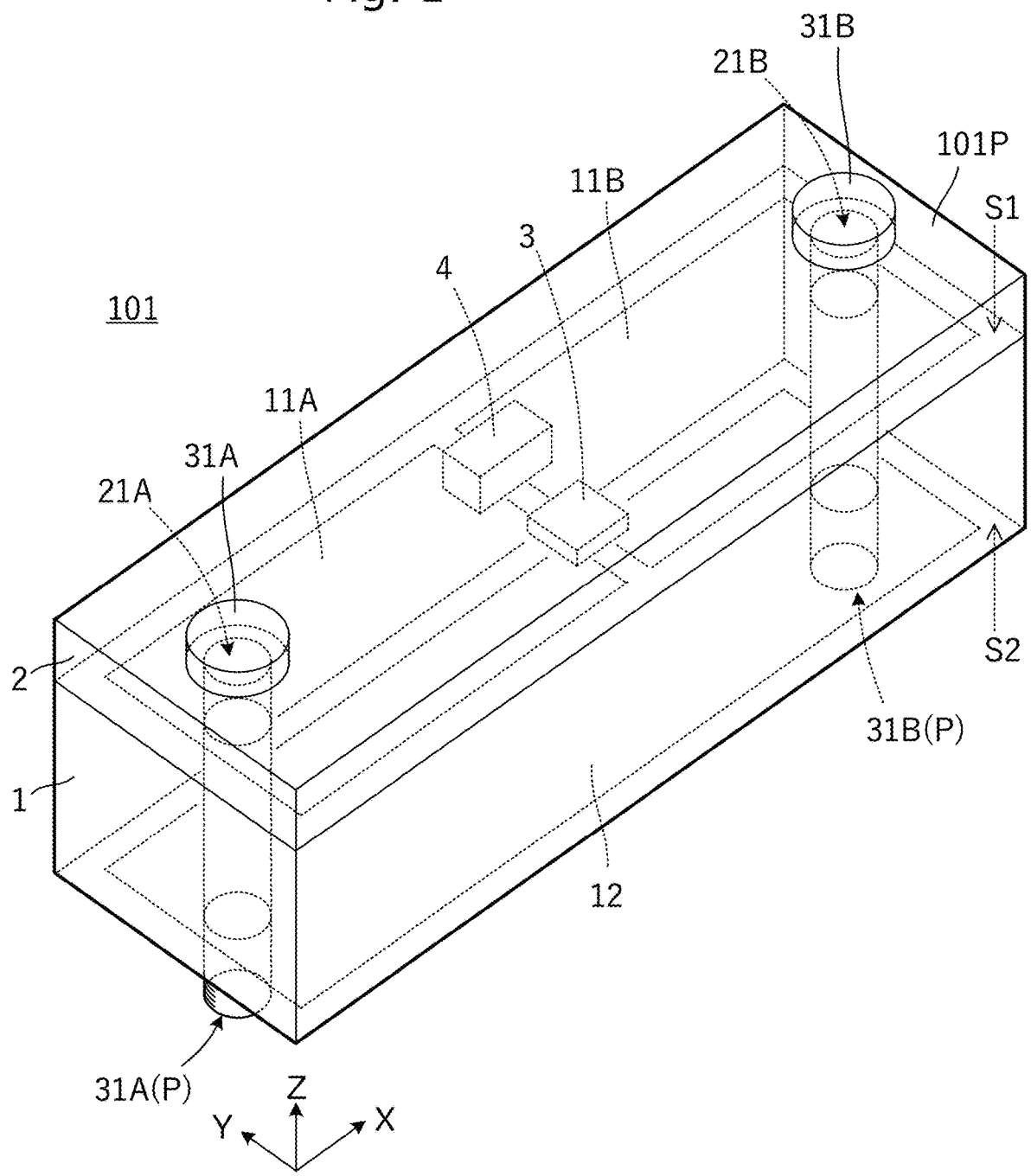
FIG. 1 is a perspective view of an RFID tag 101 according to a first exemplary embodiment.

Hereinafter, a plurality of exemplary embodiments will be described with reference to the attached drawings and several specific examples. It is noted that, in the drawings, components and elements assigned with the same reference numerals or symbols will represent the same or corresponding components and elements. While an exemplary embodiment of the present invention is divided and described into the plurality of exemplary aspects for the sake of convenience in consideration of ease of description or understanding of main points, elements described in different exemplary embodiments are able to be partially replaced or combined with each other as should be appreciated to one skilled in the art. In second and subsequent exemplary embodiments, a description of features common to the first exemplary embodiment will be omitted, and different features will be mainly described. In particular, the same or substantially the same advantageous functions and effects by the same configurations will not be described one by one for each subsequent exemplary embodiment.

First Exemplary Embodiment

Figure 2:
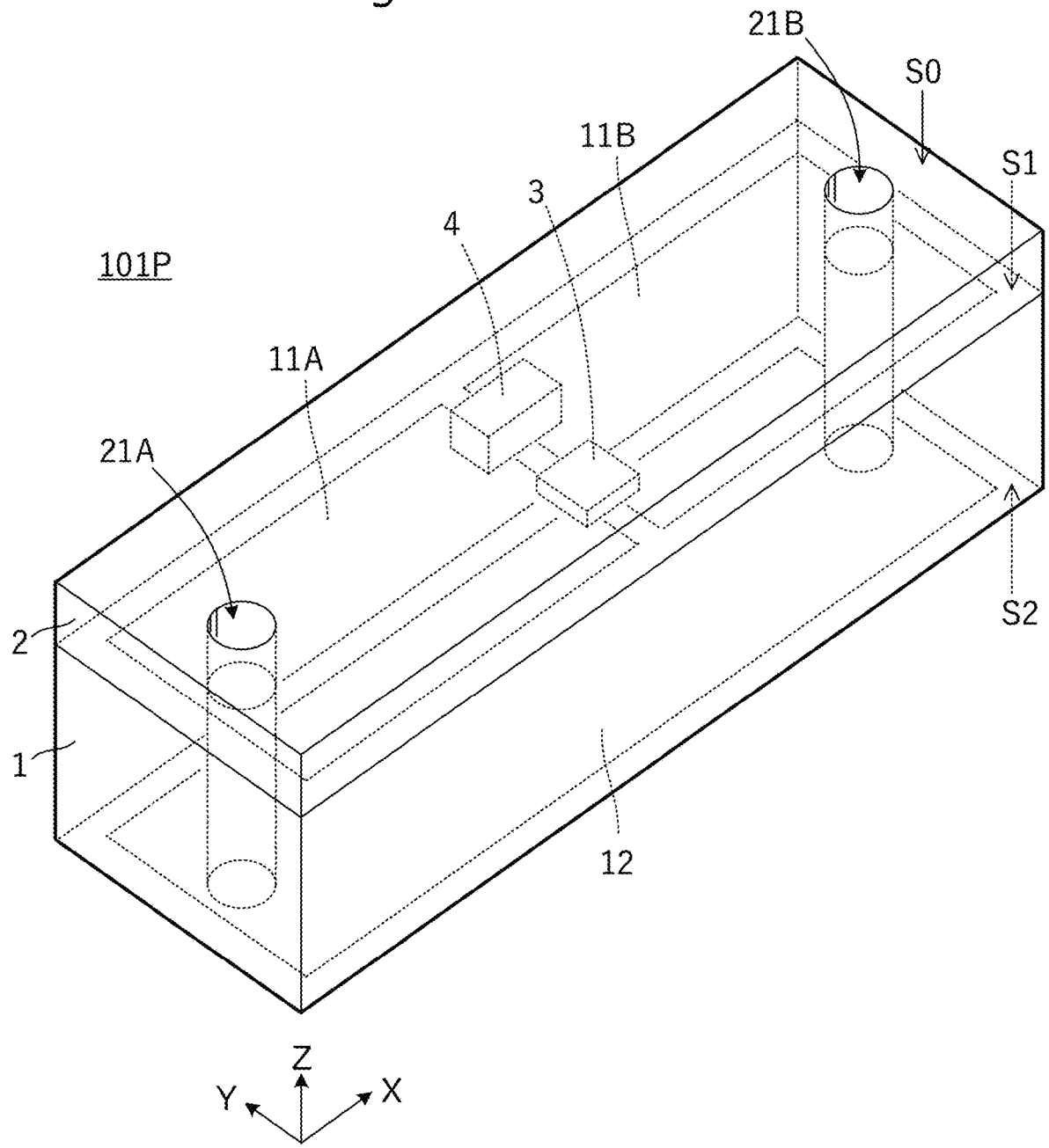
FIG. 2 is a perspective diagram of an RFID tag block 101P in a stage before the RFID tag 101 is configured.
Figure 3A:
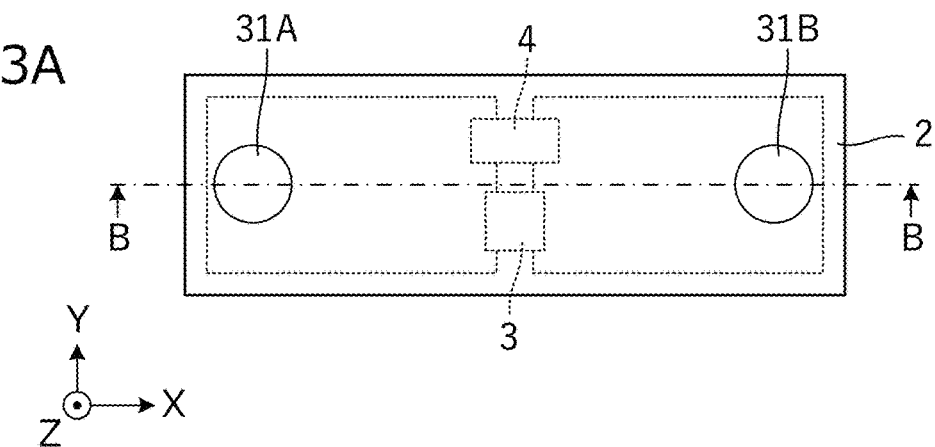
FIG. 3A is a plan view of the RFID tag 101.
Figure 3B:
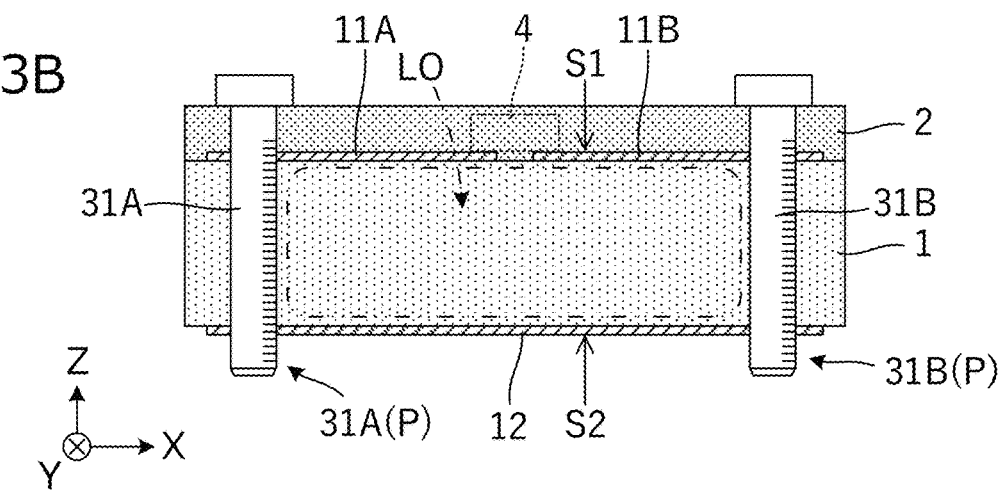
FIG. 3B is a vertical cross-sectional view of a B-B portion in FIG. 3A.
Figure 3C:
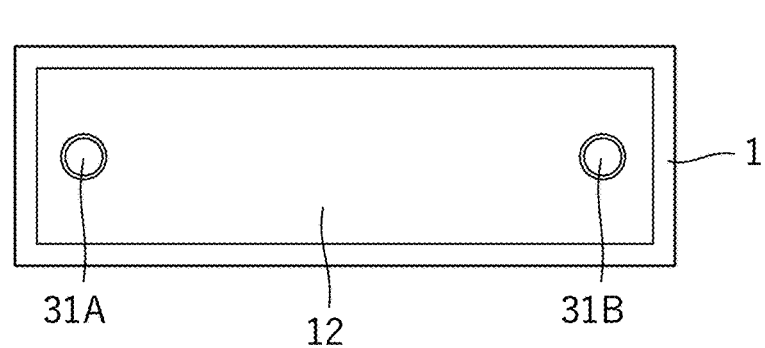
FIG. 3C is a bottom view of the RFID tag 101.
Figure 4A:
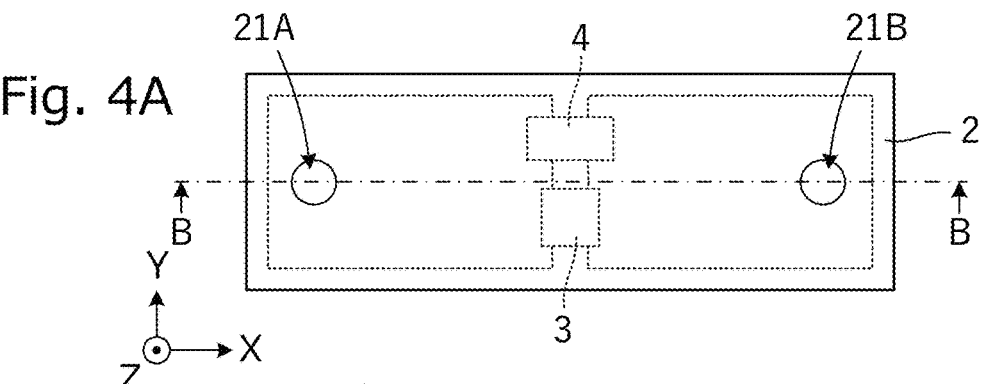
FIG. 4A is a plan view of the RFID tag block 101P.
Figure 4B:
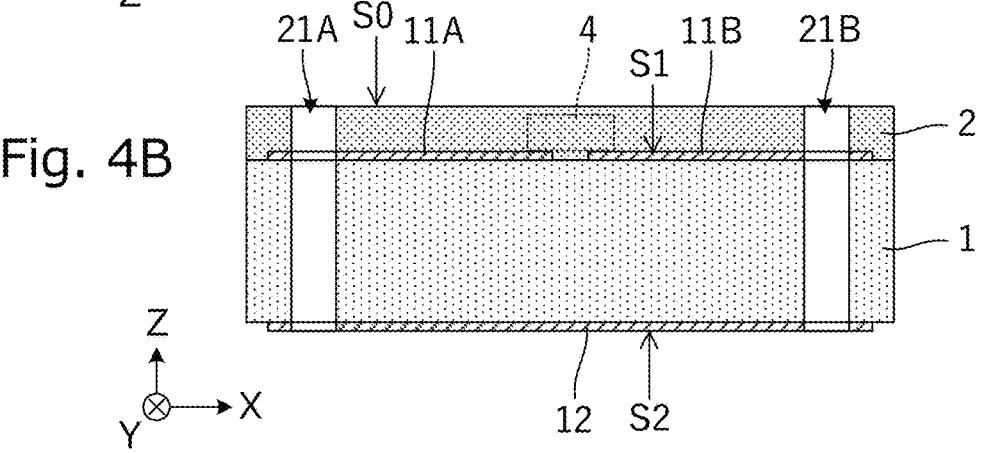
FIG. 4B is a vertical cross-sectional view of a B-B portion in FIG. 4A.
Figure 4C:
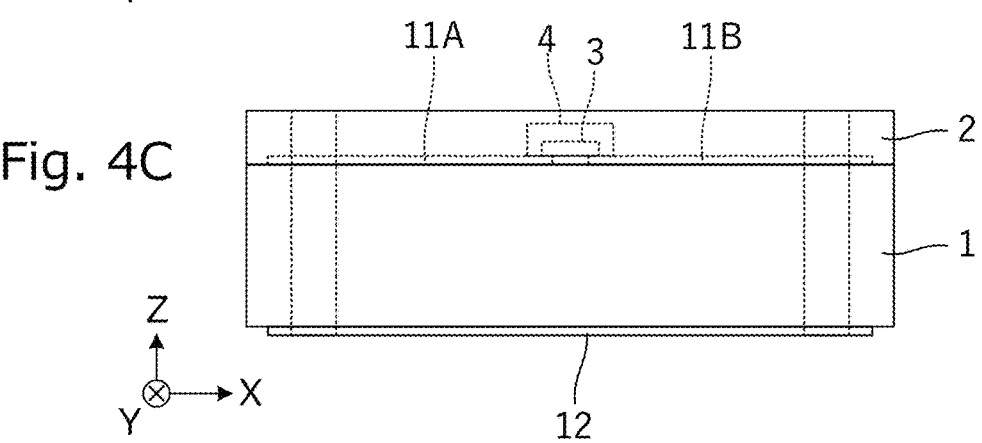
FIG. 4C is a front view of the RFID tag block 101P.
Figure 4D:
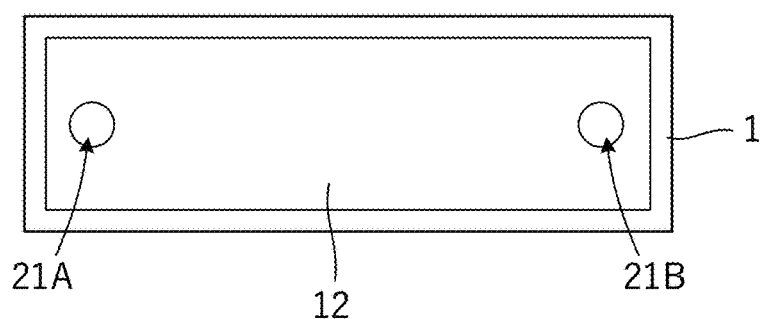
FIG. 4D is a bottom view of the RFID tag block 101P.

FIG. 1 is a perspective view of an RFID tag 101 according to a first exemplary embodiment, and FIG. 2 is a perspective diagram of an RFID tag block 101P in a stage immediately before the RFID tag 101 is configured. In addition, FIG. 3A is a plan view of the RFID tag 101, FIG. 3B is a vertical cross-sectional view of a B-B portion in FIG. 3A, and FIG. 3C is a bottom view of the RFID tag 101. Further, FIG. 4A is a plan view of the RFID tag block 101P, FIG. 4B is a vertical cross-sectional view of a B-B portion in FIG. 4A, FIG. 4C is a front view of the RFID tag block 101P, and FIG. 4D is a bottom view of the RFID tag block 101P.

As shown, the RFID tag 101 is provided by attaching conductive screws 31A and 31B to the RFID tag block 101P. The RFID tag block 101P includes a substrate 1 including a first surface S1 and a second surface S2 that are opposite to each other, and a sealing resin layer 2 provided on the first surface S1 of the substrate 1. The substrate 1, for example, is a glass epoxy substrate of which both sides include a copper foil pattern. The sealing resin layer 2 is made of a hard resin material such as an epoxy resin, for example. Moreover, the conductive screws 31A and 31B are made of a metal material such as iron, copper, brass, stainless steel, titanium, or aluminum.

As shown in FIG. 2, FIG. 4A, FIG. 4B, FIG. 4C, and FIG. 4D, first-surface-side conductor patterns 11A and 11B are provided on the first surface S1 of the substrate 1. A second-surface-side conductor pattern 12 is provided on the second surface S2 of the substrate 1. In addition, an RFIC 3 and a chip capacitor 4 are mounted on the first surface S1 so as to cross the first-surface-side conductor pattern 11A and the first-surface-side conductor pattern 11B. In other words, the RFIC 3 includes two terminals connected to the first-surface-side conductor pattern 11A and the first-surface-side conductor pattern 11B, and the chip capacitor 4 includes two terminals connected to the first-surface-side conductor pattern 11A and the first-surface-side conductor pattern 11B. The RFIC 3, for example, is an IC for an RFID tag using a UHF band such as a 900 MHz band or a microwave band such as a 2.45 GHz band. The chip capacitor 4 is an element configured to provide a portion of a resonant circuit to be described later.

The substrate 1 and the sealing resin layer 2 include interlayer connection holes 21A and 21B that penetrate from an upper surface S0 of the sealing resin layer 2 to the second surface S2 of the substrate 1.

As clearly shown by the comparison between FIG. 1 and FIG. 2, the RFID tag 101 is provided by attaching the conductive screws 31A and 31B in the interlayer connection holes 21A and 21B. A tip portion of the conductive screws 31A and 31B is projected from the lower surface of the substrate 1. In other words, as shown in FIG. 1 and FIG. 3B, projecting portions 31A(P) and 31B(P) of the conductive screws 31A and 31B project from the substrate 1 and specifically from the second surface S2 thereof. In such a state, the conductive screw 31A comes into contact with the first-surface-side conductor pattern 11A and the second-surface-side conductor pattern 12, and the conductive screw 31B comes into contact with the first-surface-side conductor pattern 11B and the second-surface-side conductor pattern 12. In other words, the first-surface-side conductor pattern 11A and the second-surface-side conductor pattern 12 are electrically connected to each other through the conductive screw 31A, and the first-surface-side conductor pattern 11B and the second-surface-side conductor pattern 12 are electrically connected to each other through the conductive screw 31B. According to the present embodiment, the conductive screws 31A and 31B configure the "interlayer connection conductor".

In this configuration, the first-surface-side conductor patterns 11A and 11B, the second-surface-side conductor pattern 12, and the conductive screws 31A and 31B collectively define one loop. The RFIC 3 and the chip capacitor are inserted into a current path of the loop. FIG. 3B illustrates an open surface LO of the loop. The second surface S2 of the substrate 1 of the RFID tag 101 is a mounting surface of the RFID tag 101 with respect to a conductive element to be described later.

It is noted that the conductive screws 31A and 31B are used when the RFID tag block 101P is attached to a conductive element, and FIG. 1, FIG. 3A, FIG. 3B, and FIG. 3C are views for the description.

Figure 5:
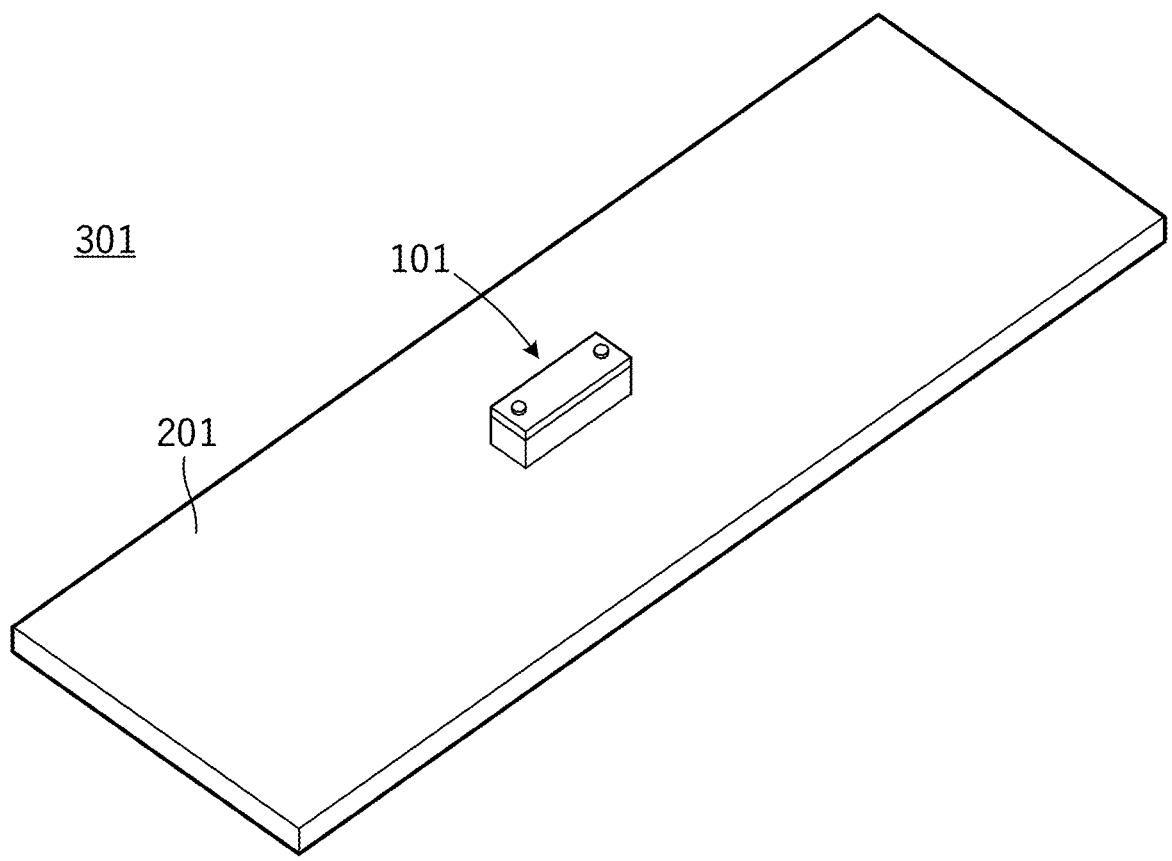
FIG. 5 is a perspective view of an RFID tagged article 301.
Figure 6:
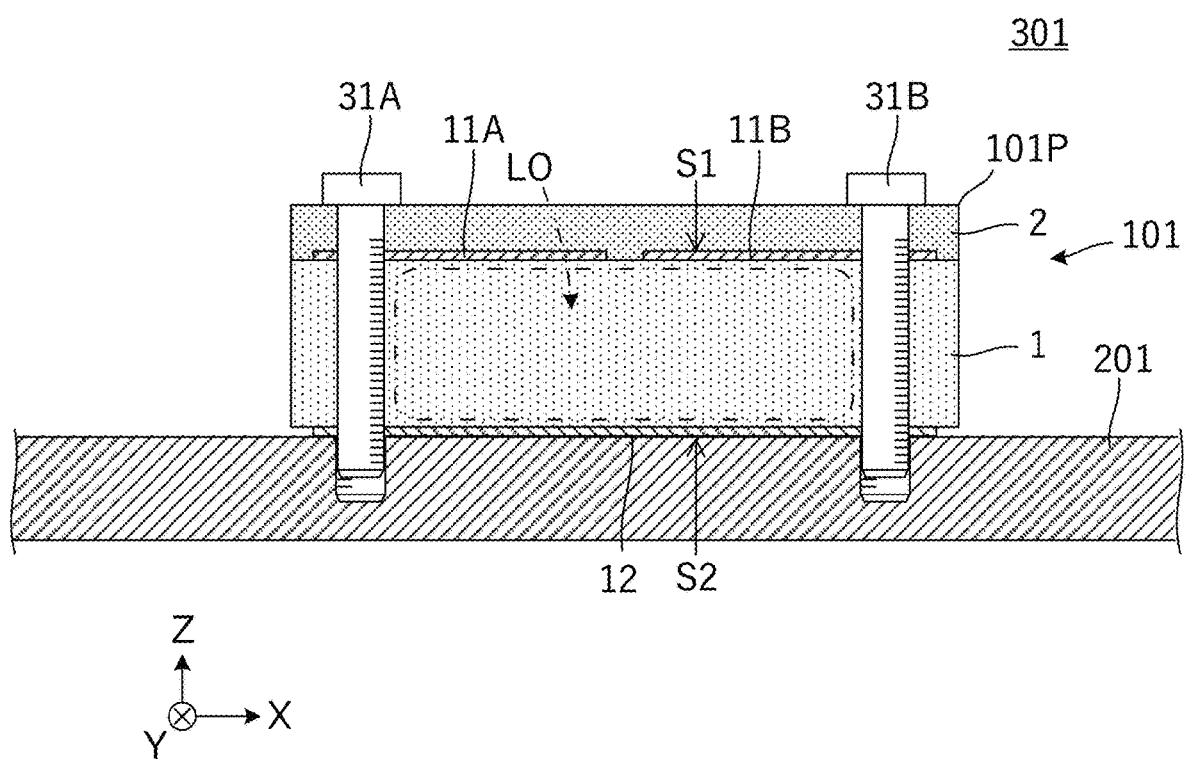
FIG. 6 is a partially vertical cross-sectional view of the RFID tagged article 301.

FIG. 5 is a perspective view of an RFID tagged article 301. FIG. 6 is a partially vertical cross-sectional view of the RFID tagged article 301. The RFID tagged article 301 includes a conductive element 201, an RFID tag block 101P, and conductive screws 31A and 31B. The conductive element 201 includes screw holes into which the conductive screws 31A and 31B are screwed. The RFID tag block 101P is attached to the conductive element 201 when the conductive screws 31A and 31B are screwed into the screw holes. In such a state, the RFID tag 101 and the RFID tagged article 301 are provided.

The axial direction (i.e., a direction parallel to the Z axis) of the conductive screws 31A and 31B is perpendicular to the first surface S1 and the second surface S2 of the substrate 1. In addition, the open surface LO of the loop is perpendicular to the first surface S1 and the second surface S2. In the coordinate system shown in FIG. 6, the open surface LO of the loop is parallel to the X-Z plane.

According to the exemplary aspect, the RFID tag 101 is configured to communicate with an RFID tag reader (or an RFID tag reader/writer) while being magnetically coupled to each other. In other words, communication is performed in a state in which magnetic flux generated from the RFID tag reader (or the RFID tag reader/writer) interlinks the open surface LO of the loop.

It is noted that, as shown in FIG. 6, the second-surface-side conductor pattern 12 and the conductive element 201 contact and are electrically connected to each other. Accordingly, the conductive element 201 may be configured to function as a portion of an emitter. The mounting surface (i.e., the second surface S2 of the substrate 1) of the RFID tag 101 and the conductive element 201 may be insulated in an exemplary aspect. In such a case, the second-surface-side conductor pattern 12 and the conductive element 201 may be capacitively coupled to each other, and the conductive element 201 may be used as a portion of an emitter.

Figure 7:
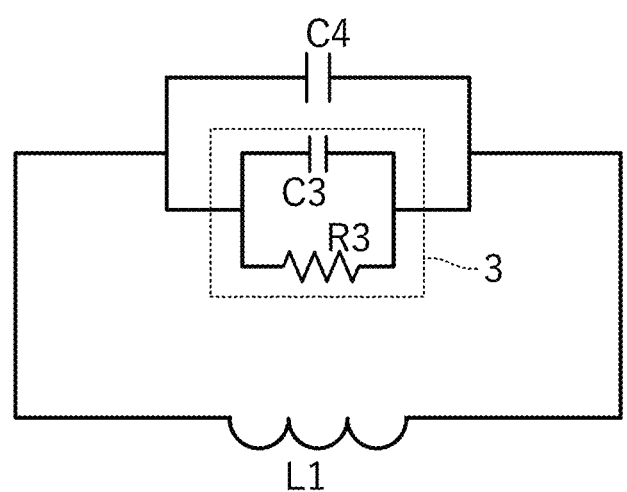
FIG. 7 is an equivalent circuit diagram of the RFID tagged article 301.

FIG. 7 is an equivalent circuit diagram of the RFID tagged article 301. In FIG. 7, a capacitor C4 corresponds to the chip capacitor 4. An inductor L1 is an inductor provided by a loop defined by the first-surface-side conductor patterns 11A and 11B, the second-surface-side conductor pattern 12, and the conductive screws 31A and 31B. In addition, in this example, the RFIC 3 is represented by a parallel circuit including a capacitor C3 and a resistance element R3.

In FIG. 7, the capacitors C3 and C4 and the inductor L1 define an LC parallel resonant circuit. The resonant frequency of the LC parallel resonant circuit is a frequency in or near a frequency band used as an RFID tag.

It is noted that the inductor L1 is not limited to an inductor provided only by a loop defined by the first-surface-side conductor patterns 11A and 11B, the second-surface-side conductor pattern 12, and the conductive screws 31A and 31B. For example, in order to adjust a resonant frequency, a meander-like conductor pattern or a chip inductor may be provided on the substrate 1. In other words, an inductance of the inductor L1 may be appropriately determined by the conductor patterns or components.

Figure 8:
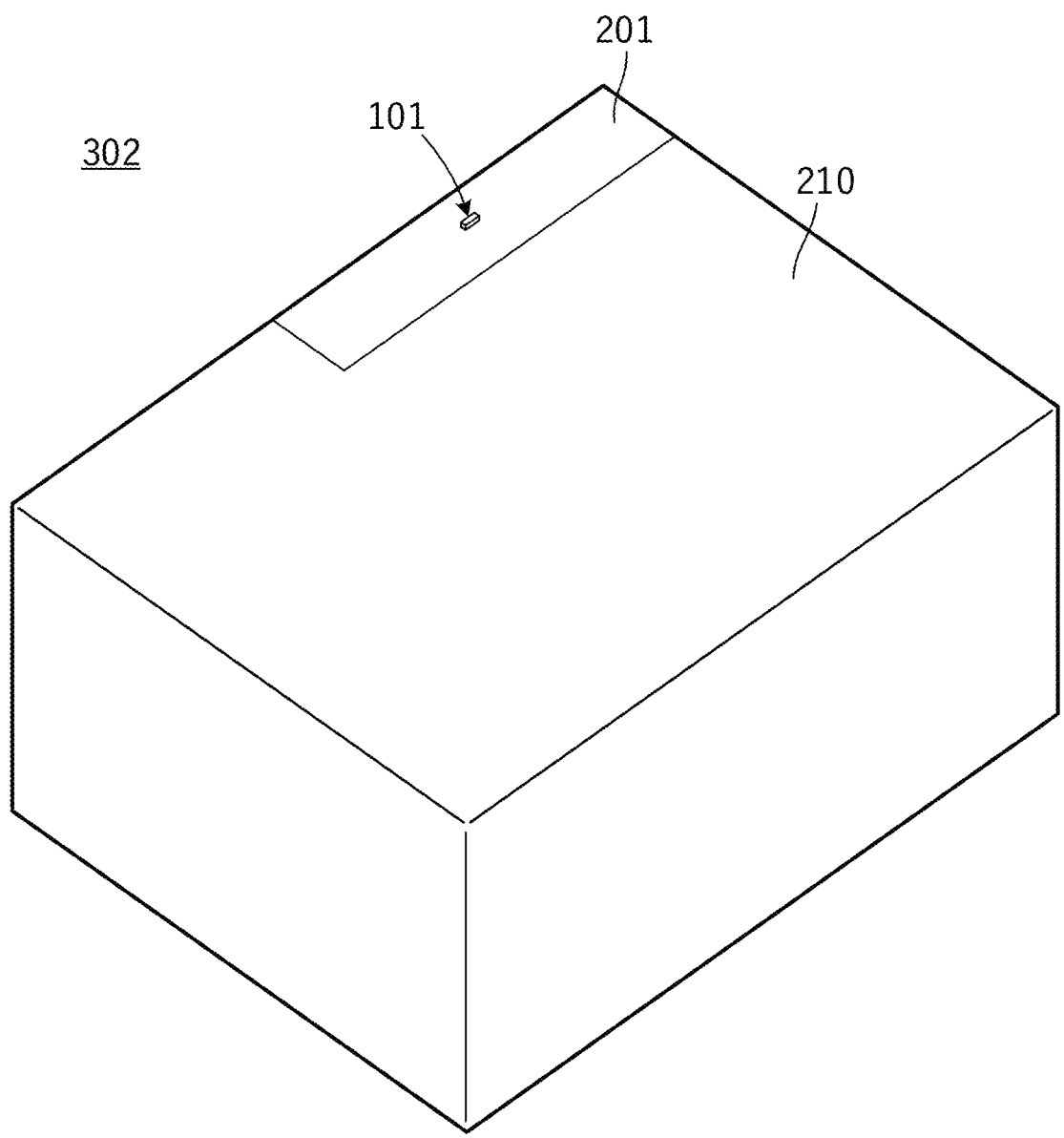
FIG. 8 is a perspective view of an RFID tagged article 302.

Subsequently, an RFID tagged article will be described. FIG. 8 is a perspective view of an RFID tagged article 302. The RFID tagged article 302 includes an article body 210, a conductive element 201, and an RFID tag 101. In an exemplary aspect, the RFID tag 101 is screwed to the conductive element 201 being a portion of the RFID tagged article 302. In this example, the article body 210 is made of an electrically insulating material.

In this manner, an RFID tagged article may be provided such that the RFID tag 101 is attached to the conductive element 201 being a portion of the RFID tagged articles 302.

Figure 9:
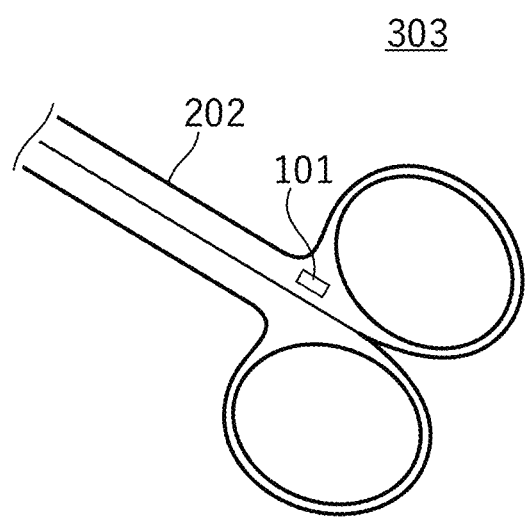
FIG. 9 is a partial plan view of an RFID tagged article 303.

FIG. 9 is a partial plan view of an RFID tagged article 303. The RFID tagged article 303 is an article obtained by attaching the RFID tag 101 to a small steel article 202 such as hemostatic forceps or medical scissors. The RFID tag 101 is screwed to the small steel article 202 by a conductive screw.

As with the small steel article 202 shown in FIG. 9, the small steel article 202 to which the RFID tag 101 is attached, in a case of being a medical instrument, may be exposed to a high temperature environment for sterilization treatment. In a case in which the RFID tag 101 is attached to the small steel article 202 with an adhesive, there is a possibility that out gas is generated from the adhesive. Further, in a case in which the RFID tag 101 is attached to the small steel article 202 with a rubber tube, it is impossible to sterilize the interior of the rubber tube, and thus sufficient sterilization treatment is unable to be performed.

In contrast, according to the first exemplary embodiment, it is possible to attach the RFID tag 101 to the small steel article 202 by screwing without using an adhesive or a rubber tube.

It is noted that the conductive screw is preferably made of the same material as the material of the small steel article 202. For example, in a case in which the material of the small steel article 202 is stainless steel, the material of the conductive screw is also preferably stainless steel. Accordingly, it is possible to avoid bimetallic corrosion between the small steel article 202 and the conductive screw. However, it is not necessary that compositions of the material are the same in variations of the exemplary aspect.

In addition, bimetallic corrosion is avoidable as long as moisture does not penetrate into an interface between the small steel article 202 and the conductive screw. For example, the small steel article 202 and the conductive screw may be electrically isolation-insulated by resin-sealing the RFID tag 101.

Second Exemplary Embodiment

A second exemplary embodiment illustrates an RFID tag including an interlayer connection conductor that is different in configuration from the interlayer connection conductor according to the first exemplary embodiment.

Figure 10A:
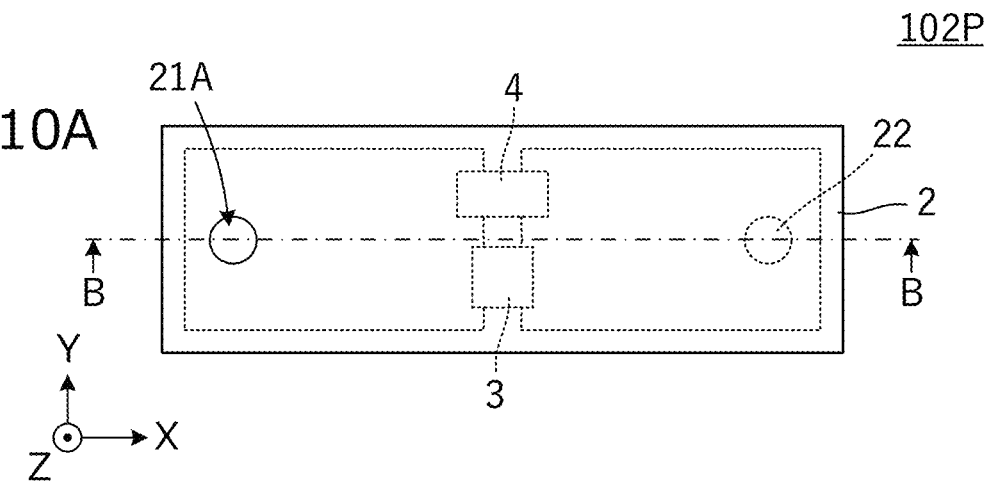
FIG. 10A is a plan view of an RFID tag block 102P according to a second exemplary embodiment.
Figure 10B:
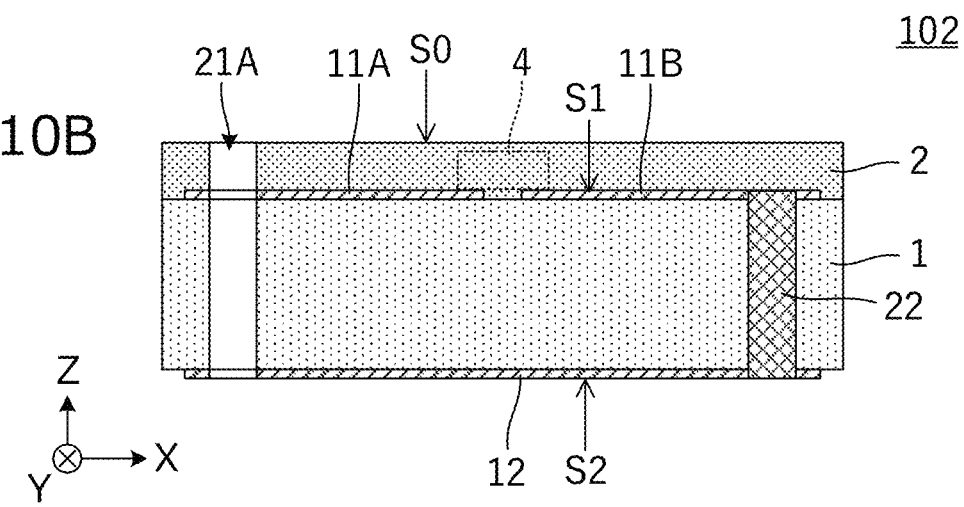
FIG. 10B is a vertical cross-sectional view of the RFID tag block 102P.

FIG. 10A is a plan view of an RFID tag block 102P according to the second exemplary embodiment, and FIG. 10B is a vertical cross-sectional view of a B-B portion in FIG. 10A. FIG. 11A, FIG. 11B, FIG. 11C, and FIG. 11D are vertical cross-sectional views showing a structure of the RFID tag block 102P in order of manufacturing steps.

The RFID tag block 102P according to the second exemplary embodiment includes a substrate 1 including a first surface S1 and a second surface S2 that are opposite to each other, and a sealing resin layer 2 provided on the first surface S1 of the substrate 1. First-surface-side conductor patterns 11A and 11B are provided on the first surface S1 of the substrate 1. A second-surface-side conductor pattern 12 is provided on the second surface S2 of the substrate 1. In addition, an RFIC 3 and a chip capacitor 4 are mounted on the first surface S1 so as to cross the first-surface-side conductor pattern 11A and the first-surface-side conductor pattern 11B. In other words, the RFIC 3 includes two terminals connected to the first-surface-side conductor pattern 11A and the first-surface-side conductor pattern 11B, and the chip capacitor 4 includes two terminals connected to the first-surface-side conductor pattern 11A and the first-surface-side conductor pattern 11B.

An interlayer connection conductor 22 of which both ends are connected to the first-surface-side conductor pattern 11B and the second-surface-side conductor pattern 12 is provided inside the substrate 1. In addition, the substrate 1 and the sealing resin layer 2 include an interlayer connection hole 21A that penetrates from an upper surface S0 of the sealing resin layer 2 to the second surface S2 of the substrate 1.

Figure 11A:
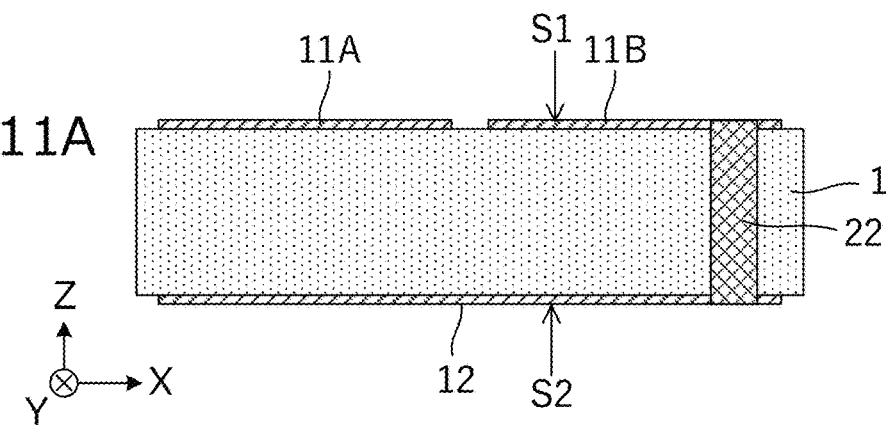
FIG. 11A, FIG. 11B, FIG. 11C, and FIG. 11D are vertical cross-sectional views showing a structure of the RFID tag block 102P in order of manufacturing steps.

FIG. 11A is a vertical cross-sectional view in the middle of manufacturing the RFID tag block 102P. The first-surface-side conductor patterns 11A and 11B are provided on the first surface S1 of the substrate 1, and the second-surface-side conductor pattern 12 is provided on the second surface S2. In addition, an interlayer connection hole that penetrates from the first surface S1 to the second surface S2 of the substrate 1 is provided in the substrate 1, and an interlayer connection conductor 22 is provided by filling a conductive material in the hole. The interlayer connection conductor 22 is provided by filling the hole with a conductive paste including a metal material including Sn as a main material, a solvent, and a resin component, for example, and then heating and solidifying the conductive paste. Alternatively, the interlayer connection conductor 22 is provided by forming and filling a copper plating film, for example.

Figure 11B:
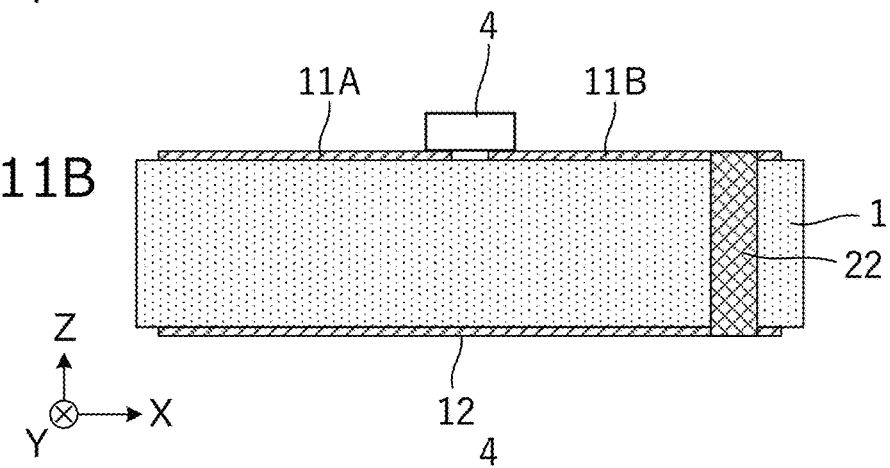
Figure 11C:
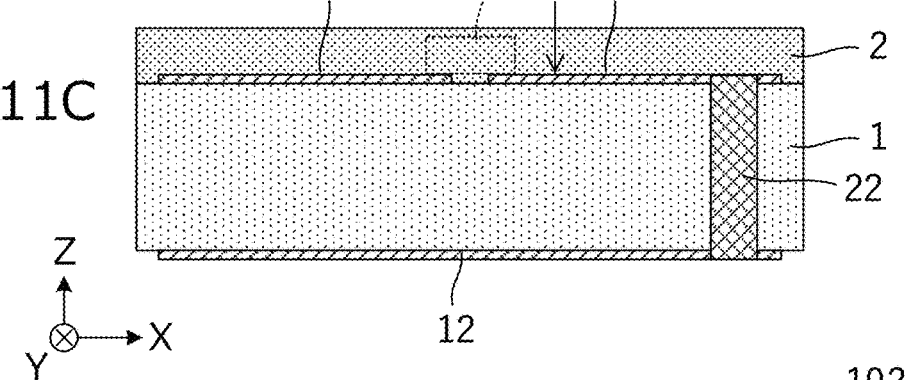
Figure 11D:
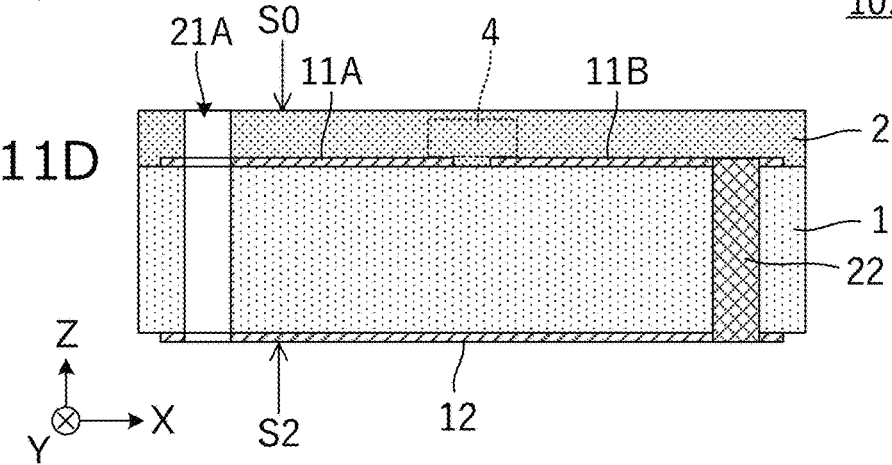

Subsequently, as shown in FIG. 11B, an RFIC 3 and a chip capacitor 4 are mounted on the first-surface-side conductor patterns 11A and 11B so as to cross the first-surface-side conductor patterns 11A and 11B (see, e.g., FIG. 10A). Subsequently, as shown in FIG. 11C, a sealing resin layer 2 is provided by applying a hard resin material such as an epoxy resin to the first surface S1 of the substrate 1. Subsequently, as shown in FIG. 11D, an interlayer connection hole 21A that penetrates from an upper surface S0 of the sealing resin layer 2 to the second surface S2 of the substrate 1 is provided in the substrate 1 and the sealing resin layer 2. An RFID tag block 102P is provided according to the above described steps.

Figure 12:
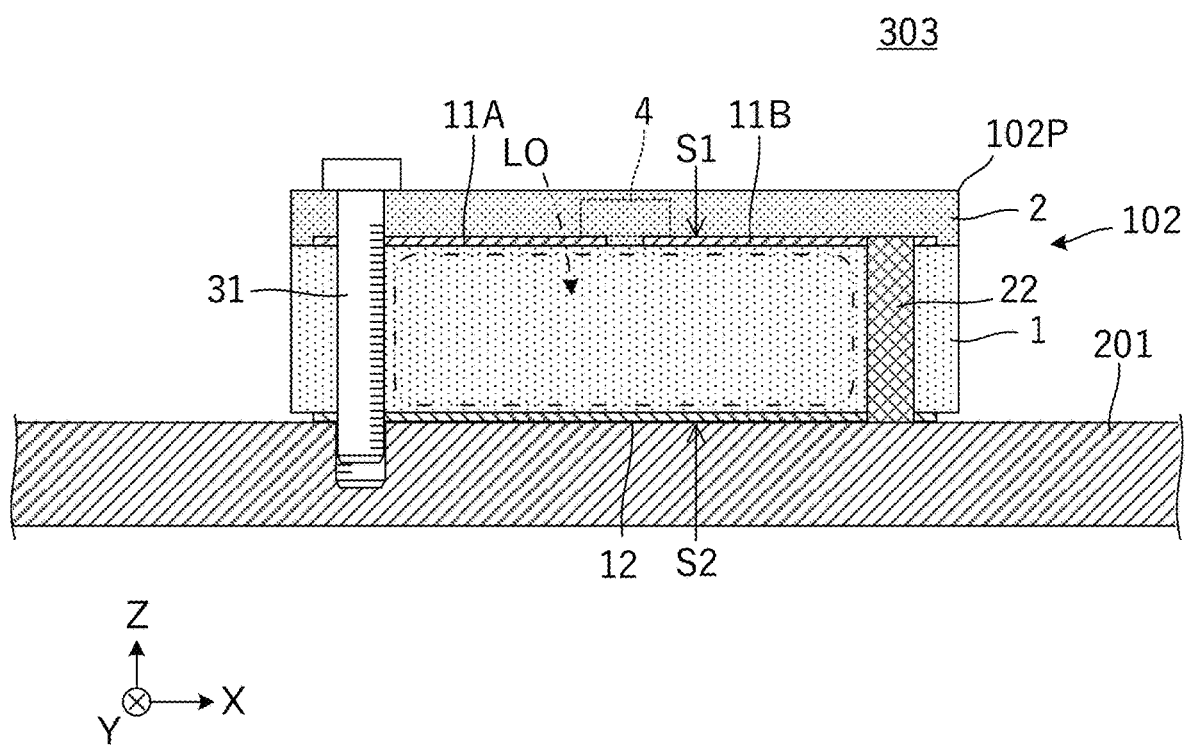
FIG. 12 is a vertical cross-sectional view of an RFID tag 102 and an RFID tagged article 303 including the RFID tag 102 according to the second exemplary embodiment.

FIG. 12 is a vertical cross-sectional view of an RFID tag 102 and an RFID tagged article 303 including the RFID tag 102 according to the second exemplary embodiment. The RFID tagged article 303 includes a conductive element 201, an RFID tag block 102P, and a conductive screw 31. The conductive element 201 includes a screw hole into which the conductive screw 31 is screwed. The RFID tag block 102P is attached to the conductive element 201 when the conductive screw 31 is screwed into the screw hole. In such a state, the RFID tag 102 and the RFID tagged article 303 are provided.

In this configuration, the first-surface-side conductor patterns 11A and 11B, the second-surface-side conductor pattern 12, and the conductive screw 31 collectively define one loop. FIG. 12 illustrates an open surface LO of the loop.

The axial direction (i.e., a direction parallel to the Z axis) of the conductive screw 31 is perpendicular to the first surface S1 and the second surface S2 of the substrate 1. In addition, the open surface LO of the loop is perpendicular to the first surface S1 and the second surface S2. In the coordinate system shown in FIG. 12, the open surface LO of the loop is parallel to the X-Z plane.

In this manner, the RFID tag 102 according to the second exemplary embodiment is provided by attaching the RFID tag block 102P to the conductive element 201 by one conductive screw 31.

Third Exemplary Embodiment

A third exemplary embodiment illustrates an RFID tag including an interlayer connection conductor that is different in configuration from the interlayer connection conductor according to the first and second exemplary embodiments.

Figure 13A:
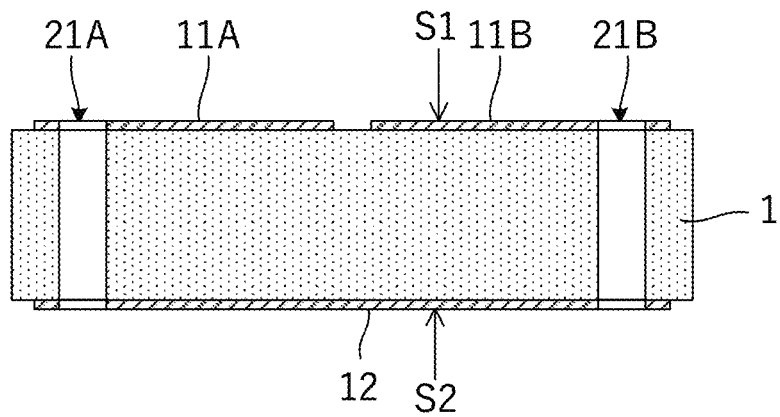
FIG. 13A, FIG. 13B, and FIG. 13C are vertical cross-sectional views showing a structure of an RFID tag block 103P according to a third exemplary embodiment, in order of manufacturing steps.
Figure 13B:
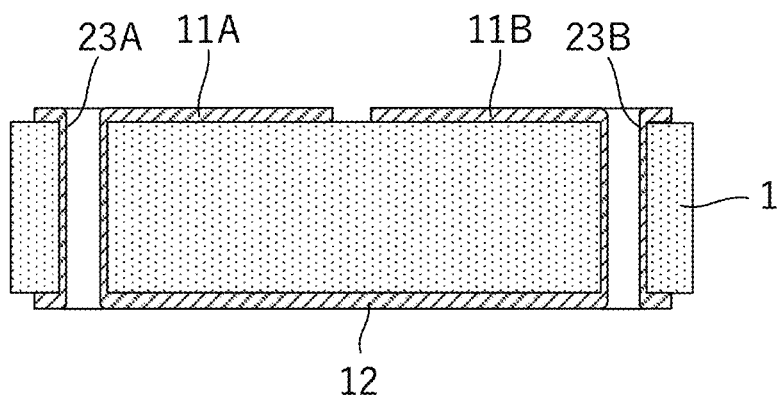
Figure 13C:
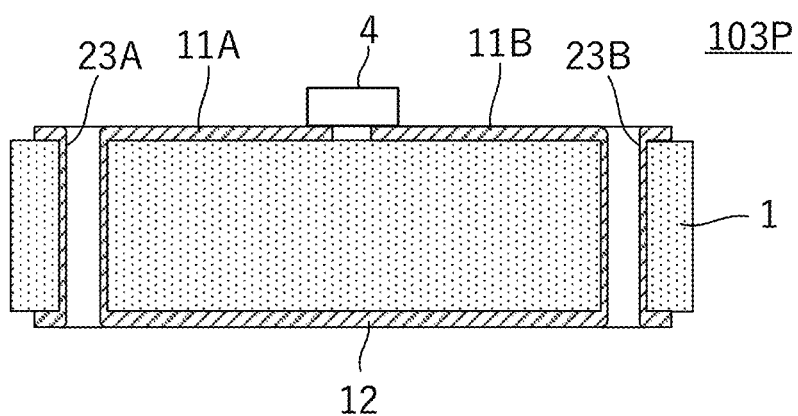

FIG. 13A, FIG. 13B, and FIG. 13C are vertical cross-sectional views showing a structure of an RFID tag block 103P in order of manufacturing steps. FIG. 13A is a vertical cross-sectional view in the middle of manufacturing the RFID tag block 103P. The first-surface-side conductor patterns 11A and 11B are provided on the first surface S1 of the substrate 1, and the second-surface-side conductor pattern 12 is provided on the second surface S2. Subsequently, interlayer connection holes 21A and 21B that penetrate from the first surface S1 to the second surface S2 of the substrate 1 are provided.

Subsequently, as shown in FIG. 13B, interlayer connection conductors 23A and 23B are provided by a plating film on an inner surface of the interlayer connection holes 21A and 21B. For example, the first-surface-side conductor patterns 11A and 11B and the second-surface-side conductor pattern 12 are copper foil, and the interlayer connection conductors 23A and 23B are copper plating films.

Subsequently, as shown in FIG. 13C, a chip capacitor 4 is mounted on the first-surface-side conductor patterns 11A and 11B so as to cross the first-surface-side conductor patterns 11A and 11B. Although not shown in the cross-section in FIG. 13C, an RFIC 3 is also mounted across the first-surface-side conductor patterns 11A and 11B, as with the above described exemplary embodiments.

Figure 14:
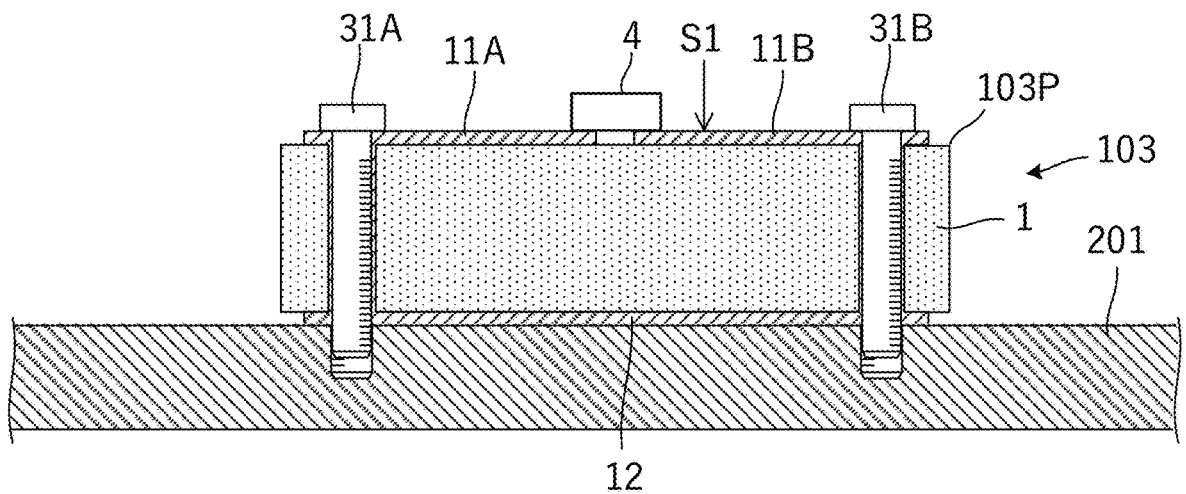
FIG. 14 is a vertical cross-sectional view of an RFID tag 103 and an RFID tagged article 304 including the RFID tag 103 according to the third exemplary embodiment.

FIG. 14 is a vertical cross-sectional view of an RFID tag 103 and an RFID tagged article 304 including the RFID tag 103 according to the third exemplary embodiment. The RFID tagged article 304 includes a conductive element 201, an RFID tag block 103P, and conductive screws 31A and 31B. The conductive element 201 includes screw holes into which the conductive screws 31A and 31B are screwed. The RFID tag block 103P is attached to the conductive element 201 when the conductive screws 31A and 31B are screwed into the screw holes. In such a state, the RFID tag 103 and the RFID tagged article 304 are provided.

According to the third exemplary embodiment, both the interlayer connection conductors 23A and 23B and the conductive screws 31A and 31B provide an interlayer connection conductor, so that the electric resistance value of the interlayer connection conductor that connects the first-surface-side conductor patterns 11A and 11B and the second-surface-side conductor patterns 12 is reduced, and the conductor loss is reduced.

It is noted that, in the example shown in FIG. 14, the first surface S1 of the substrate 1, although being exposed, may be covered by a sealing resin layer, as with the above described exemplary embodiments.

Fourth Exemplary Embodiment

A fourth exemplary embodiment illustrates an RFID tag inside including a coil having two or more turns.

Figure 15:
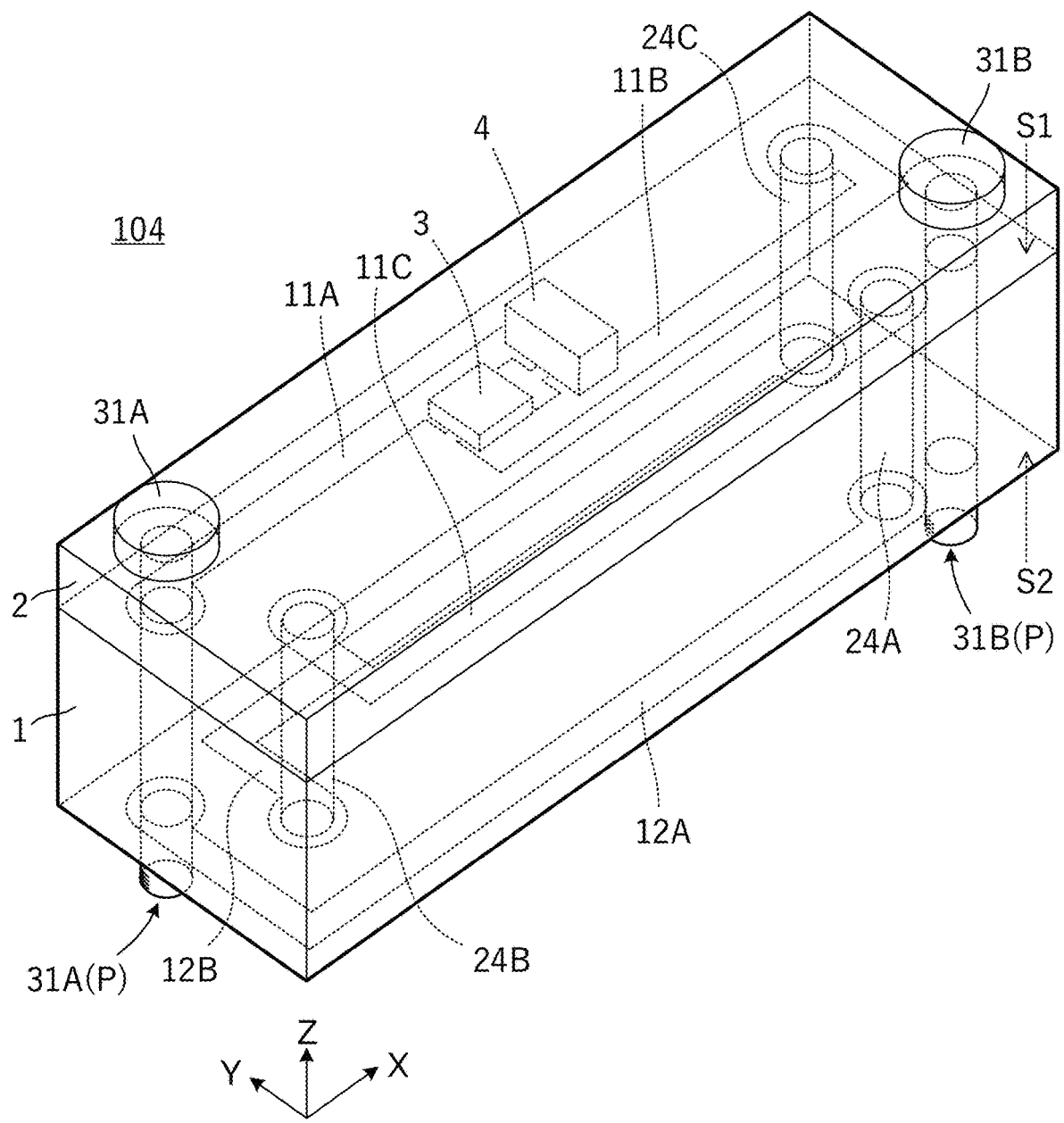
FIG. 15 is a perspective view of an RFID tag 104 according to a fourth exemplary embodiment.
Figure 16:
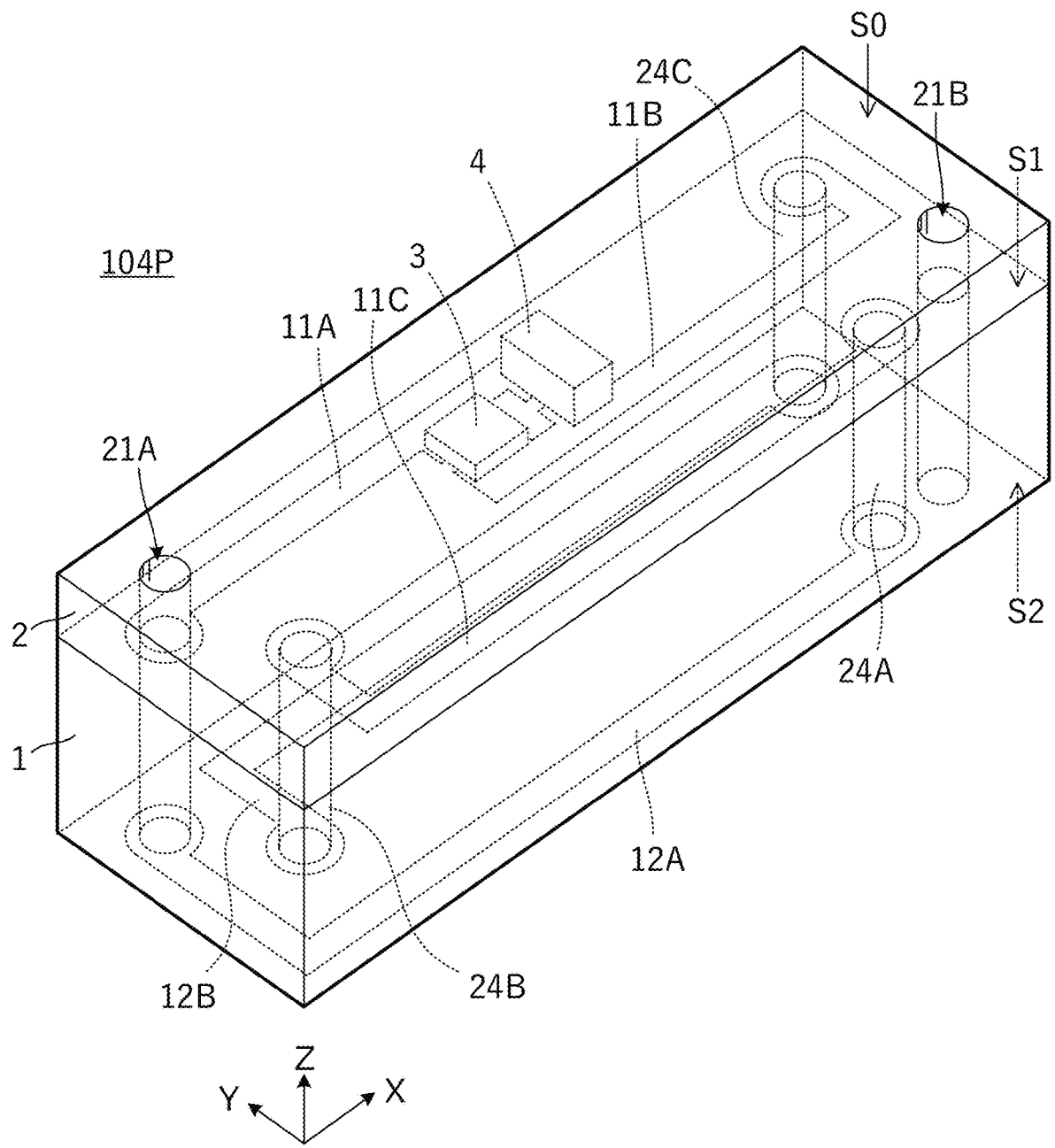
FIG. 16 is a perspective view of an RFID tag block 104P according to the fourth exemplary embodiment.

FIG. 15 is a perspective view of an RFID tag 104 according to the fourth exemplary embodiment. FIG. 16 is a perspective view of an RFID tag block 104P.

The RFID tag 104 is provided by attaching conductive screws 31A and 31B to the RFID tag block 104P. The RFID tag block 104P includes a substrate 1 including a first surface S1 and a second surface S2 that are opposite to each other, and a sealing resin layer 2 provided on the first surface S1 of the substrate 1.

As shown in FIG. 16, first-surface-side conductor patterns 11A, 11B, and 11C are provided on the first surface S1 of the substrate 1. Second-surface-side conductor patterns 12A and 12B are provided on the second surface S2 of the substrate 1. In addition, an RFIC 3 and a chip capacitor 4 are mounted on the first surface S1 so as to cross the first-surface-side conductor pattern 11A and the first-surface-side conductor pattern 11B. In other words, the RFIC 3 includes two terminals connected to the first-surface-side conductor pattern 11A and the first-surface-side conductor pattern 11B, and the chip capacitor 4 includes two terminals connected to the first-surface-side conductor pattern 11A and the first-surface-side conductor pattern 11B.

As shown in FIG. 16, the substrate 1 includes interlayer connection conductors 24A, 24B, and 24C each extending from the first surface S1 to the second surface S2. The interlayer connection conductor 24A is connected between a first end of the second-surface-side conductor pattern 12A and a first end of the first-surface-side conductor pattern 11C. The interlayer connection conductor 24B is connected between a first end of the second-surface-side conductor pattern 12B and a second end of the first-surface-side conductor pattern 11C. The interlayer connection conductor 24C is connected between a second end of the second-surface-side conductor pattern 12B and a first end of the first-surface-side conductor pattern 11B.

The substrate 1 and the sealing resin layer 2 include interlayer connection holes 21A and 21B that penetrate from an upper surface S0 of the sealing resin layer 2 to the second surface S2 of the substrate 1.

As clearly shown by the comparison between FIG. 15 and FIG. 16, the RFID tag 104 is provided by attaching the conductive screws 31A and 31B in the interlayer connection holes 21A and 21B. In such a state, the first end of the first-surface-side conductor pattern 11A and the second end of the second-surface-side conductor pattern 12A are electrically connected to each other through the conductive screw 31A. Therefore, a coil having about two turns is provided in a path of the first-surface-side conductor pattern 11A→the conductive screw 31A→the second-surface-side conductor pattern 12A→the interlayer connection conductor 24A→the first-surface-side conductor pattern 11C→the interlayer connection conductor 24B→the second-surface-side conductor pattern 12B→interlayer connection conductor 24C→the first-surface-side conductor pattern 11B. The RFID tag 104 has a structure in which the RFIC 3 and the chip capacitor 4 are connected between opposite ends of the coil.

As shown in each of the above described exemplary embodiments, an RFID tagged article is provided by screwing the RFID tag 104 to a conductive element through the conductive screws 31A and 31B. It is noted that the conductive screw 31B is not in contact with any conductor pattern in particular, so that, even without the conductive screw 31B, the RFID tag 104 is able to function as an RFID tag. However, in order to retain mechanical strength, it is preferable to screw the RFID tag block 104P with a plurality of conductive screws 31A and 31B in this manner.

Fifth Exemplary Embodiment

A fifth exemplary embodiment illustrates an RFID tag including a sealing resin layer that is different in configuration from the sealing resin layer according to the above described exemplary embodiments.

Figure 17:
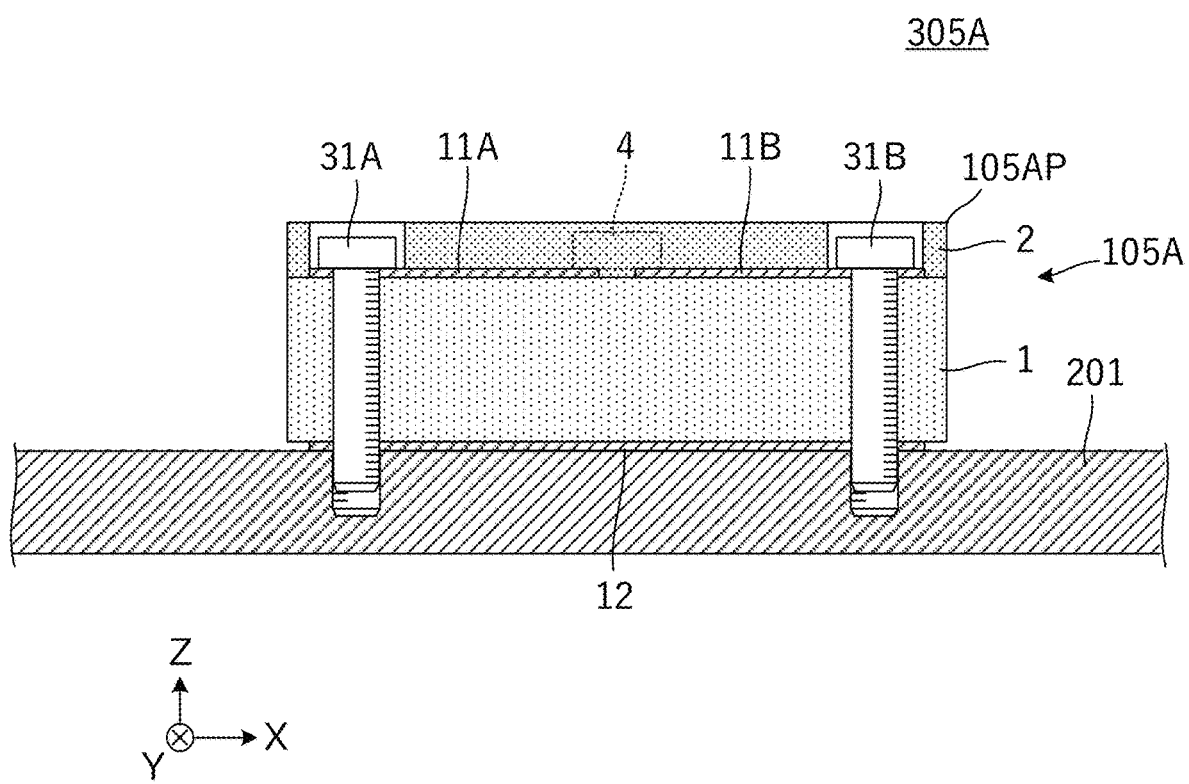
FIG. 17 is a partially vertical cross-sectional view of an RFID tag 105A and an RFID tagged article 305A according to a fifth exemplary embodiment.

FIG. 17 is a partially vertical cross-sectional view of an RFID tag 105A and an RFID tagged article 305A according to the fifth exemplary embodiment. The RFID tag 105A includes an RFID tag block 105AP, and conductive screws 31A and 31B.

The structure of the sealing resin layer 2 is different from the structure of the example shown in FIG. 6. In the example shown in FIG. 17, an opening is provided in positions of the sealing resin layer 2 to which each of the conductive screws 31A and 31B are attached. In other words, the periphery of a lower surface of the head of the conductive screws 31A and 31B is in contact with the first-surface-side conductor patterns 11A and 11B, respectively.

The conductive element 201 includes screw holes into which the conductive screws 31A and 31B are screwed. The RFID tag block 105AP is attached to the conductive element 201 when the conductive screws 31A and 31B are screwed into the screw holes. In such a state, the RFID tagged article 305A is provided.

The height of the RFID tag 105A is reduced in the example shown in FIG. 17. In addition, an area in which the conductive screws 31A and 31B are in contact with the first-surface-side conductor patterns 11A and 11B is large, which reduces the electrical resistance of a contact portion.

Figure 18:
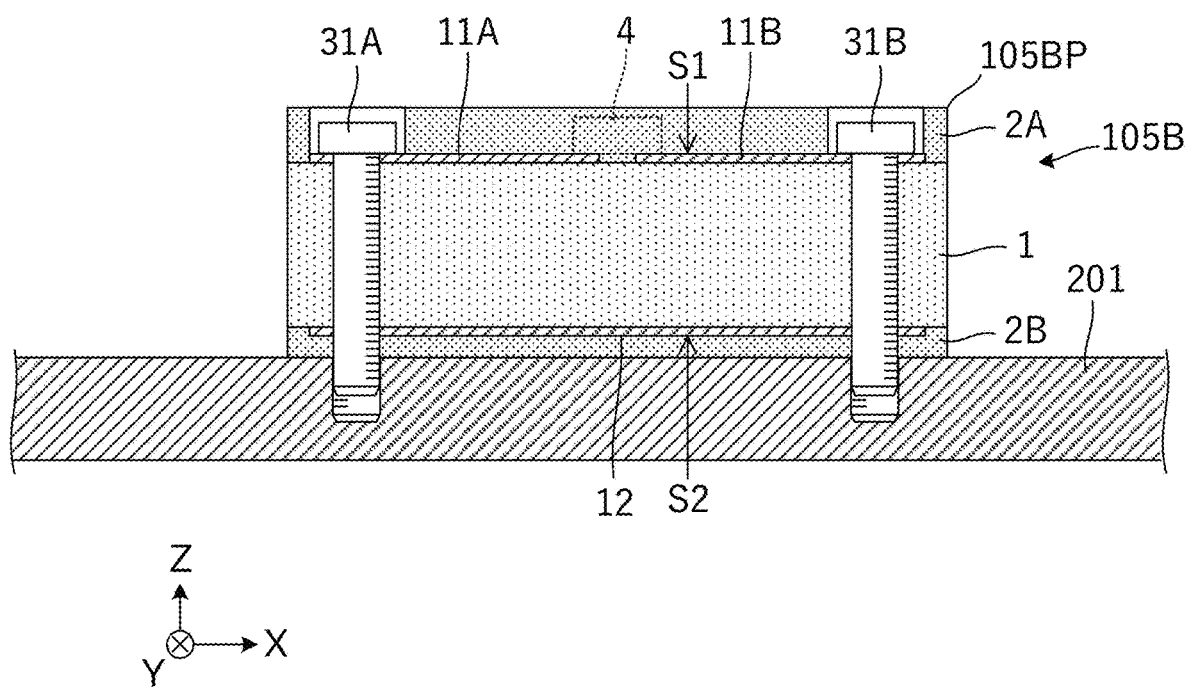
FIG. 18 is a partially vertical cross-sectional view of an RFID tag 105B and an RFID tagged article 305B according to the fifth exemplary embodiment.

FIG. 18 is a partially vertical cross-sectional view of an RFID tag 105B and an RFID tagged article 305B according to the fifth exemplary embodiment. The first surface S1 of the substrate 1 of the RFID tag block 105BP is covered by a sealing resin layer 2A, and the second surface S2 is covered by a sealing resin layer 2B. As in this example, the sealing resin layer 2B may be disposed on the mounting surface of the RFID tag 105B. According to this configuration, the second-surface-side conductor pattern 12 is able to be protected from an external environment. In addition, the loop defined by the first-surface-side conductor patterns 11A and 11B, the second-surface-side conductor pattern 12, and the conductive screws 31A and 31B, is able to be capacitively coupled to the conductive element 201.

Additional Exemplary Embodiments

Although the above example describes the RFID tag block as a single body in the drawing at any stage of a manufacturing process, it is noted that the RFID tag block can be manufactured in each step in a state of being a mother substrate that is finally divided, so that a large number of RFID tag blocks may be simultaneously manufactured.

In addition, although the above described exemplary embodiments provide an RFID tag including a substrate having a glass epoxy base material, a loop or a coil may be provided on a substrate having a magnetic body such as magnetic ferrite.

In addition, although the above example describes the configuration in which the chip capacitor 4 to provide a resonant circuit is mounted on the substrate, a capacitance component provided in the RFIC 3 may be used as a capacitor of an LC resonant circuit. Moreover, a capacitor of a resonant circuit may be configured by providing electrodes facing each other, on the substrate 1.

In addition, a conductor pattern can be provided on an inner layer by use of a multilayer substrate including a plurality of base materials that are stacked on one another. In addition, a substrate made of a ceramic material instead of a resin material may be used. In addition, the first-surface-side conductor pattern and the second-surface-side conductor pattern may be provided by printing of a conductive material instead of metal foil.

In addition, although each of the above described exemplary embodiments provides the configuration in which the terminal of the RFIC is directly connected to the loop or the coil, a coil for magnetic coupling may be provided inside the RFIC, a coil for magnetic coupling may be provided at a portion of the first-surface-side conductor pattern of the substrate, and both coils may be configured to be magnetically coupled to each other.

In addition, the conductive screws 31A and 31B and similar components are not limited to screws entirely made of a metal material, and may be configured by plating a polycarbonate (PC) product with a conductive film, for example.

Finally, it is generally noted that the above described exemplary embodiments are to be considered in all respects as illustrative and not restrictive. It is to be understood that variations and modifications will be apparent to those skilled in the art. The scope of the present invention is defined not by the above described exemplary embodiments but by the scope of claims for patent.

What is claimed:
1. An RFID tag comprising:
   a substrate comprising:
      a first surface and a second surface that are opposite to each other;
      a first-surface-side conductor pattern disposed on the first surface;
      a second-surface-side conductor pattern disposed on the second surface; and
      a plurality of interlayer connection holes extending from the first surface to the second surface and that connect the first-surface-side conductor pattern to the second-surface-side conductor pattern;

an RFIC mounted on the first surface of the substrate, and connected to the first-surface-side conductor pattern or electromagnetically coupled to the first-surface-side conductor pattern; and a plurality of interlayer connection conductors provided in each of the plurality of interlayer connection holes, wherein the plurality of interlayer connection conductors include at least one conductive screw inserted in one of the plurality of interlayer connection holes and electrically connecting the first-surface-side conductor pattern to the second-surface-side conductor pattern.

2. The RFID tag according to claim 1, wherein the first-surface-side conductor pattern, the second-surface-side conductor pattern, and the plurality of interlayer connection conductors collectively define a coil or a loop.

3. The RFID tag according to claim 2, wherein the coil or the loop includes an open surface.

4. The RFID tag according to claim 3, wherein the at least one conductive screw comprises an axial direction that is perpendicular to the first surface and the second surface.

5. The RFID tag according to claim 4, wherein the open surface of the coil or the loop is perpendicular to the first surface and the second surface.

6. The RFID tag according to claim 1, further comprising a resin layer disposed on the first surface of the substrate and covering the first-surface-side conductor pattern.

7. The RFID tag according to claim 6, wherein the at least one conductive screw extends through the resin layer to electrically connect the first-surface-side conductor pattern to the second-surface-side conductor pattern.

8. The RFID tag according to claim 6, wherein a periphery of a lower surface of a head of the at least one conductive screw is in contact with the first-surface-side conductor pattern.

9. The RFID tag according to claim 8, wherein the head of the at least one conductive screw is entirely disposed below an outer surface of the resin layer.

10. The RFID tag according to claim 1, wherein the first-surface-side conductor pattern comprises a pair of first-surface-side conductor patterns disposed on the first surface of the substrate.

11. The RFID tag according to claim 10, wherein the RFIC comprises two terminals connected to each of the pair of first-surface-side conductor patterns.

12. The RFID tag according to claim 10, wherein an inner surface of the plurality of interlayer connection holes comprises copper plating films and the pair of first-surface-side conductor patterns comprises a copper foil.

13. The RFID tag according to claim 10, wherein the pair of first-surface-side conductor patterns and the at least one conductive screw comprise a meander-like conductor pattern configured to define a resonant frequency.

14. The RFID tag according to claim 1, wherein the plurality of interlayer connection conductors include a conductive filling that extends in one of the plurality of interlayer connection holes.

15. An RFID tagged article comprising:
an article including a conductive element; and
an RFID tag comprising:
    a substrate comprising a first surface and a second surface that are opposite to each other;
    a first-surface-side conductor pattern disposed on the first surface;
    a second-surface-side conductor pattern disposed on the second surface; and
    a plurality of interlayer connection holes extending from the first surface to the second surface and that connect the first-surface-side conductor pattern to the second-surface-side conductor pattern;
    an RFIC mounted on the first surface of the substrate, and connected to the first-surface-side conductor pattern or electromagnetically coupled to the first-surface-side conductor pattern; and
    a plurality of interlayer connection conductors provided in each of the plurality of interlayer connection holes,
    wherein the plurality of interlayer connection conductors include at least one conductive screw inserted in one of the plurality of interlayer connection holes and electrically connecting the first-surface-side conductor pattern to the second-surface-side conductor pattern,
wherein the RFID tag is screwed to the conductive element by the at least one conductive screw.

16. The RFID tagged article according to claim 15, wherein the second-surface-side conductor pattern is capacitively coupled to the conductive element, such that the conductive element is configured as an emitter.

17. The RFID tagged article according to claim 15, wherein the at least one conductive screw comprises a same material as the article.

18. The RFID tagged article according to claim 15, wherein the first-surface-side conductor pattern, the second-surface-side conductor pattern, and the plurality of interlayer connection conductors collectively define a coil or a loop.

19. The RFID tagged article according to claim 18, wherein the coil or the loop includes an open surface that is perpendicular to the first surface and the second surface.

20. The RFID tagged article according to claim 19, wherein the at least one conductive screw comprises an axial direction that is perpendicular to the first surface and the second surface of the substrate.

* * * * *